United States Patent

Jakob et al.

[11] Patent Number: 6,093,766
[45] Date of Patent: Jul. 25, 2000

[54] PROCESS FOR PREPARING POLYVINYL ALCOHOL STABILIZED SOLVENT- AND PLASTIFIER-FREE POLYVINYL ESTER DISPERSIONS

[75] Inventors: Martin Jakob, Kelkheim; Werner Prass, Mainz, both of Germany

[73] Assignee: Clariant GmbH, Frankfurt, Germany

[21] Appl. No.: 09/150,594

[22] Filed: Sep. 10, 1998

[30] Foreign Application Priority Data

Sep. 11, 1997 [DE] Germany .................... 197 39 936

[51] Int. Cl.$^7$ ................ C08J 3/09; C08L 31/04
[52] U.S. Cl. ............. 524/461; 524/765; 526/203
[58] Field of Search .................... 524/461, 765; 526/203

[56] References Cited

U.S. PATENT DOCUMENTS 4,164,489  8/1979  Daniels et al. .................... 260/29.6
5,907,011  5/1999  Jakob et al. .................... 524/524

FOREIGN PATENT DOCUMENTS 0444827  9/1991  European Pat. Off. .

*Primary Examiner*—David W. Wu
*Assistant Examiner*—Kelechi C. Egwim
*Attorney, Agent, or Firm*—Miles B. Dearth; Scott E. Hanf

[57] ABSTRACT

The present invention relates to the preparation of heterogeneous, water-resistant polyvinyl ester dispersions having a film-forming temperature of below 10° C., comprising the formation of a homo- or copolymer A, having a glass transistion temperature of more that 20° C., by seed polymerization of a monomer mixture comprising 85–100% by weight of a vinyl ester of carboxylic acids having 1 to 18 carbon atoms, 0–10% by weight of an $\alpha,\beta$-unsaturated carboxylic acid and/or of an N-functional compound and 0–5% by weight of a polyethylenically unsaturated monomer in the presence of a seed base comprising a copolymer B having a glass transition temperature of below 20° C., comprising 45–98% by weight of a vinyl ester of carboxylic acids having 1 to 18 carbon atoms, 2–50% by weight of an $\alpha$-olefin having 1 to 4 carbon atoms and 0–5% by weight of a polyethylenically unsaturated monomer.

12 Claims, No Drawings

PROCESS FOR PREPARING POLYVINYL ALCOHOL STABILIZED SOLVENT- AND PLASTIFIER-FREE POLYVINYL ESTER DISPERSIONS

BACKGROUND OF THE INVENTION

The present invention relates to a process for preparing a polyvinyl ester dispersion stabilized with protective colloid and to its use as a solvent-free and plasticizer-free adhesive having increased water resistance of its film for bonding porous substrates.

Dispersion adhesives, which in many cases have a composition based on polyvinyl esters, are frequently formulated in practice with low- or high-boiling solvents. In their function as temporary plasticizers, the solvents serve as aids to film consolidation by lowering the minimum film-forming temperature or the white point of the dispersions. This measure ensures that the adhesives can be processed even at temperatures close to the freezing point of water. Their advantage lies in a minimal adverse influence on the mechanical properties of the adhesive film; a great disadvantage, however, is the emission of solvents into the environment. A list of common solvents suitable for this purpose can be found, for example, in Wood Adhesives, Chemistry and Technology, Volume 1, Marcel Dekker, New York, 1989, on pp. 332/333 and in Volume 2 on pp. 44.

A further function of the solvents is to prevent coagulation of the dispersions when the adhesives are stored at low temperatures. The addition of low boilers such as methanol, ethanol and acetone as antifreeze agents to polyvinyl acetate dispersions is described in Chemical Abstracts 86: 56287s.

Another group of higher-boiling compounds is added to the adhesive dispersions as permanent plasticizers. Dibutyl phthalate and similar compounds, for example, can be placed in this group. Although they remain in the film after drying, they can nevertheless impair the thermal stability of the adhesive bond and its resistance to cold flow. An overview of these compounds can likewise be found in Wood Adhesives, Chemistry and Technology, Volume 1, Marcel Dekker, New York, 1989, on p. 331 and in Volume 2 on p. 43/44.

A solvent-free and plasticizer-free adhesive composition is fundamentally advantageous in terms of environmental and user protection since there is total abandonment both of toxicologically objectionable substances and of substances which pose a threat to the environment or are a source of odor nuisance in the course of use. It can therefore be used in particular in adhesive formulations labeled as "solvent free".

While there are applications which are covered by special water-resistant, polyvinyl ester-based specialty adhesives, based for the most part on chemical crosslinking reactions, such as the construction of wooden windows, for example, in the market even for all-round glues the manufacturer of adhesives base materials is frequently faced not only with the requirement for environmental acceptability but also with that for at least short-term water resistance of the adhesive bonds i.e. without opening of the bonded joints.

DE-A 44 31 343 relates to a solvent- and plasticizer-free adhesive dispersion based on vinyl esters, especially vinyl acetate, which in terms of its performance properties, such as the thermal stability of the bonds, the freeze-thaw stability of the dispersions and the setting rate is comparable with conventional, externally plasticized polyvinyl ester dispersions. It describes a heterogeneous dispersion having a minimum film-forming temperature of 0–7° C. which consists of two homo- and/or copolymeric vinyl esters having a different glass transition temperature ($T_g$).

It consists firstly of a homo- or copolymer A having a glass transition temperature of more than 20° C., comprising
- 85–100% by weight of a vinyl ester of carboxylic acids having 1 to 18 carbon atoms (a1), especially vinyl acetate,
- 0–5% by weight of an $\alpha,\beta$-unsaturated carboxylic acid (a2),
- 0–5% by weight of an N-functional compound (a3) and
- 0–5% by weight of a polyethylenically unsaturated monomer (a4), and secondly of a copolymer B having a glass transition temperature of less than 20° C., comprising
- 45–98% by weight of a vinyl ester of carboxylic acids having 1 to 18 carbon atoms (b1), especially vinyl acetate,
- 2–50% by weight of an $\alpha$-olefin having 1 to 4 carbon atoms (b2), especially ethylene, and
- 0–5% by weight of a polyethylenically unsaturated monomer (b3).

Said document also relates to a process for preparing the heterogeneous polyvinyl ester dispersions by mixing the dispersion of the homo- or copolymer A with that of the copolymer B, and also to a process for preparing heterogeneous polyvinyl ester dispersion powders by spray-drying the polyvinyl ester dispersions prepared thus in accordance with that invention, and to a process for preparing heterogeneous polyvinyl ester dispersions by redispersing the polyvinyl ester dispersion powders in water.

It is known in principle that dispersions of heterogeneous composition can be prepared not only by mixing dispersions of different polymer composition but also by means of addition polymerizations onto preformed seed particles in multistage emulsion polymerization techniques, with generation in many cases of polymer particles that are of heterogeneous composition as well (see A. Rudin, Macromol. Symp. 92, 53–70 (1995) and patent literature cited therein).

Heterogeneous polymer compositions are known which are produced by seed polymerizations, for preparing adhesives which are based on copolymeric polyvinyl ester dispersions and which contribute therein to improving the adhesive properties.

JP-A 252280/86 (Chemical Abstracts 106: 197587) describes an improved paper adhesive based on polyvinyl acetate with good quick-setting properties and freeze-thaw stability. The dispersion adhesive is prepared by emulsion polymerization of vinyl acetate in the presence of a seed base consisting of an ethylene-vinyl acetate copolymer with ethylene contents in the copolymer of from 10 to 30% by weight. The emulsion polymer is stabilized by polyvinyl alcohol. The adhesive is subsequently formulated with dibutyl phthalate as plasticizer.

JP-A 135575/80 (Chemical Abstracts 96: 86638) relates to seed polymerizations of vinyl acetate onto ethylene-vinyl acetate copolymers with ethylene contents of 10–55% by weight. Polyvinyl alcohol is used as stabilizer. In addition, up to 40% by weight of comonomers can be polymerized together with vinyl acetate. The emulsions find application as quick-setting paper adhesives for water-resistant paper bonds. Substantial amounts of dibutyl phthalate (20 parts by weight per 100 parts by weight of vinyl acetate) are present in the adhesives.

U.S. Pat. No. 3,769,151 describes an adhesive emulsion which is prepared by seed polymerization. The seed base used is a vinyl acetate-ethylene emulsion which is stabilized with partially hydrolyzed polyvinyl alcohol and anionic emulsifier and which has ethylene contents of 5–20% by weight; in the presence of this seed base, a terpolymer of vinyl acetate, ethylene and an unsaturated acid, such as acrylic acid, is prepared which is stabilized with a mixture of partially and fully hydrolyzed polyvinyl alcohol and also emulsifiers. The function of the acid is to improve the adhesion to vinyl films, and, advantageously, to increase the viscosity following uptake of plasticizer, which can also be used in the emulsions.

The adhesive bonds formed from the heterogeneous, solvent- and plasticizer-free polyvinyl ester dispersions of DE-A 44 31 343, although possessing good heat resistance in comparison to externally plasticized dispersions, nevertheless lack adequate short-term cold water resistance which would permit their classification, for example, in durability class D2 of EN 204 (see Comparative Example C1). The dispersions of JP-A 135575/80 apparently possess a certain degree of water resistance but are not free of plasticizer. In U.S. Pat. No. 3,769,151, ethylene is used as comonomer in both polymerization steps. Owing to the reduced glass transition temperature of the principle polymer, the heat resistance of these adhesives must be regarded a priori as low. Plasticizers, such as phthalates, are, moreover, likewise used in the products.

SUMMARY OF THE INVENTION

The object of this invention is therefore to discover a process for preparing an adhesive dispersion stabilized essentially with polyvinyl alcohol, with abandonment of low- and high-boiling solvents and plasticizers, which, based on a vinyl ester, especially vinyl acetate, as principle monomer, is comparable in terms of its performance properties, such as the heat resistance of the bonds and the freeze-thaw stability of the dispersions with the conventional, externally plasticized polyvinyl ester dispersions and which, in addition, gives the bonded joint improved short-term cold water resistance.

This object is achieved in accordance with the invention by a process for preparing a heterogeneous dispersion from two copolymeric vinyl esters, stabilized overall essentially with polyvinyl alcohol, each having a different glass transition temperature ($T_g$), which comprises initially preparing a copolymeric polyvinyl ester emulsion as seed base, the copolymer of which has a low glass transition temperature, and then conducting a second emulsion polymerization in the presence of said seed base to form a second copolymer of a vinyl ester having a higher glass transition temperature.

DESCRIPTION OF THE PREFERRED EMBODIMENTS

The present invention therefore provides a process for preparing a heterogeneous polyvinyl ester dispersion, stabilized essentially with polyvinyl alcohol, having a minimum film-forming temperature of below 10° C. and comprising a copolymer A having a glass transition temperature of more than 20° C., comprising 85–100% by weight of a vinyl ester of carboxylic acids having 1 to 18 carbon atoms (a1), 0–10% by weight of an α,β-unsaturated carboxylic acid (a2) and/or of an N-functional compound (a3) and 0–5% by weight of a polyethylenically unsaturated monomer (a4), and a copolymer B having a glass transition temperature of below 20° C., comprising 45–98% by weight of a vinyl ester of carboxylic acids having 1 to 18 carbon atoms (b1), 2–50% by weight of an α-olefin having 1 to 4 carbon atoms (b2) and 0–5% by weight of a polyethylenically unsaturated monomer (b3), the copolymer A being prepared by emulsion polymerization in the presence of a seed emulsion of the copolymer B and the proportion of the polymers A and B in the heterogeneous dispersion being 1:(0.05 to 2), preferably 1:(0.15 to 1).

The minimum film-forming temperature of the dispersion of the heterogeneous polyvinyl ester is preferably from 0 to 7° C.

Suitable monomers of group a1 are preferably vinyl esters of carboxylic acids having 1 to 12 carbon atoms, examples being vinyl formate, vinyl acetate, vinyl propionate, vinyl isobutyrate, vinyl pivalate, vinyl 2-ethylhexanoate, vinyl esters of saturated α-branched monocarboxylic acids having 9 or 10 carbon atoms in the acid residue (®Versatic acids), and also vinyl esters of longer-chain saturated or unsaturated fatty acids, such as vinyl laurate or vinyl stearate, and also vinyl esters of benzoic acid or p-tert-butylbenzoic acid. Particular preference is given to vinyl acetate.

Examples of monomers of group a2 are α,β-unsaturated acids, such as acrylic acid, methacrylic acid, α,β-unsaturated dicarboxylic acids, such as maleic acid, fumaric acid, itaconic acid and citraconic acid, and their primary monoamides or secondary monoamides or monoesters with in each case aliphatic monohydric alcohols having 1 to 18, preferably 1 to 12 carbon atoms. Particularly preferred monomers are acrylic acid and methacrylic acid. The incorporation of the free acids brings about an improvement in the freeze-thaw stability of the dispersion mixtures.

Examples of the functional nitrogen compounds a3 are (meth)acrylamide, allyl carbamate, N-methylol(meth)acrylamide, N-methylolallyl carbamate and also the N-methylol esters, -alkyl ethers or Mannich bases of N-methylol(meth)acrylamide or N-methylolallyl carbamate, acrylamidoglycolic acid, methyl acrylamidomethoxyacetate, N-(2,2-dimethoxy-1-hydroxyethyl)acrylamide. Further examples are N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide and also ethyl imidazolidonemethacrylate, vinylpyrrolidone and N-vinylformamide.

Particular preference is given to the N-methylolamides of acrylic acid and methacrylic acid. In combination with acidic hardeners, these comonomers make it possible to obtain a relatively high degree of cold water resistance of the filmed adhesives. In addition, owing to their crosslinkable groups they may bring about greater heat resistance of the filmed dispersions.

Examples of monomers of the group a4 are diallyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate.

Suitable vinyl esters of monomer group b1 used in the seed emulsion are preferably compounds specified in group a1, which may be identical to or different from those used in the homo- or copolymer A. Preferably, the vinyl ester employed for the copolymer B is the same as that used in the polymer, especially vinyl acetate.

Ethylene in particular is employed as group b2 monomer.

Suitable monomers of group b3 are the compounds specified under a4, which may be identical to or different from those used in the homo- or copolymer A.

The glass transition temperature of the homo- or copolymer A is preferably more than 25° C., in particular at least 30° C.

The glass transition temperature of the copolymer B is preferably below 15° C.

Both copolymers are stabilized in the dispersion predominantly by protective colloids, preferably by one or more polyvinyl alcohols having in particular, a degree of hydrolysis of from 60 to 100 mol-% and a viscosity of the 4% strength aqueous solution of from 2 to 70 mPas, measured at 20° C.

The polyvinyl alcohol used to prepare the seed emulsion of the copolymer B can be identical to or different from that used in the main polymerization to prepare the homo- or copolymer A. The same applies to the amounts. The proportion of the protective colloids, based on the overall mass of both copolymers, in the finished dispersion is preferably from 2 to 20% by weight, in particular from 5 to 15% by weight. Preference is given to the use of partially hydrolyzed polyvinyl alcohol having a degree of hydrolysis of 80–92 mol-%. The proportionate use of fully hydrolyzed polyvinyl alcohol, in amounts which do not impair the stability of the dispersion, preferably for the main polymerization of the monomer groups a1–a4, may further improve the effect of short-term cold water resistance.

In addition it is also possible to use customary anionic, nonionic or cationic emulsifiers as costabilizers both for the seed preparation and for the main polymerization. Their proportion can be up to 3% by weight, based on the overall mass of the homo- and/or copolymers A and B.

The preparation of the copolymeric polyvinyl ester emulsion of copolymer B used as seed emulsion is preferably conducted using vinyl acetate and ethylene as monomers from groups b1 and b2, respectively, in accordance with the customary free-radical pressure emulsion polymerization, known to the person skilled in the art, in stirred autoclaves suitable for the purpose.

By varying the process parameters, especially the ethylene partial pressure and the reaction temperature, the ethylene content in the copolymer B is set at levels between 2 and 50% by weight, preferably between 15 and 35% by weight. The glass transition temperature of the copolymer B preferably lies within an advantageous range between −15° C. and 15° C.

Free-radical initiators employed are water-soluble and/or oil-soluble initiator systems, such as peroxodisulfates, azo compounds, hydrogen peroxide, organic hydroperoxides or dibenzoyl peroxide. These can be used either alone or in combination with reducing compounds, such as Fe(II) salts, sodium pyrosulfite, sodium hydrogen sulfite, sodium sulfite, sodium dithionite, sodium formaldehydesulfoxylate or ascorbic acid, as a redox catalyst system.

Initiators particularly preferred for preparing the seed emulsion are ammonium or alkali metal peroxodisulfate alone.

Of the overall amount of polyvinyl alcohol used to stabilize the overall amount of the homo- and/or copolymers A and B, a portion can be used to prepare the seed emulsion of the copolymer B. In terms of its molecular weight and degree of hydrolysis, this portion can be identical to or different from that used in the main polymerization. If, optionally, emulsifiers are used for stabilization, they too may be used partly for preparing the seed and partly for preparing the end dispersion. The type of emulsifiers used to prepare the seed emulsion can be identical to or different from that of the emulsifiers used in the main polymerization.

If a polymerization step is conducted without using polyvinyl alcohol, the polymer prepared in that step is stabilized exclusively by way of emulsifiers. The overall amount of polyvinyl alcohol is then employed as stabilizer, alone or together with further emulsifier, in the other polymerization step.

Alternatives in both steps include introducing the stabilizers in toto prior to beginning polymerization, introducing part of them initially and metering in the other part, or else adding them subsequently.

In the preferred embodiment of this invention, polyvinyl alcohol is used both to stabilize the seed emulsion of the copolymer B and in the main polymerization to stabilize the homo- or copolymer A. When emulsifiers are used as well, they are preferably employed to prepare the seed emulsion. In this context it is particularly preferred for the total amount of stabilizers to be introduced into the liquor prior to the polymerizations in each case.

The solids content of the seed emulsion of the copolymer B is preferably between 30 and 65% by weight, in particular between 40 and 60% by weight and, with particular preference, between 45 and 55% by weight.

The preparation of the polyvinyl ester dispersion of the copolymer A takes place by customary continuous or batchwise, preferably batchwise, processes of unpressurized free-radical emulsion polymerization with initial introduction of preferably the total amount of the seed emulsion of the copolymer B and vinyl acetate as the particularly preferred monomer of group a1. The polymerization can take place in batch, feed or combined batch/feed processes, with preference being given, however, to the feed process alone owing to the improved grafting for increasing the water resistance. It can take place in the same reaction vessel directly after the end of the preparation of the copolymer B, in the manner of a two-stage polymerization, or else following transfer of the seed emulsion into a second reactor, in which case the seed emulsion can still be characterized separately.

The amount of seed emulsion introduced initially depends in particular on the ethylene content of the copolymer B. Said amount is such that the weight ratio of the homo- and/or copolymers A and B in the heterogeneous, solvent- and plasticizer-free dispersion prepared in accordance with the invention is 1:(0.05 to 2), preferably 1:(0.15 to 1), and the minimum film-forming temperature of the finished dispersion is 0–7° C.

Initiator systems preferred for preparing the copolymer A are the compounds used for preparing the copolymer B and described in that context. In order to improve the target short-term cold water resistance of the bonded joints formed from the dispersions, however, it is preferred to use redox initiator systems. A particularly preferred initiator combination consists of tert-butyl hydroperoxide and sodium formaldehyde-sulfoxylate (®Rongalit or ®Brüggolit).

The concomitant use of the unsaturated acids of monomer group a2 further improves, in particular, the freeze-thaw stability. They are either introduced initially prior to polymerization or, preferably, metered in separately during the polymerization. It is likewise possible to use anhydrides of unsaturated acids, such as maleic anhydride, which hydrolyze on contact with aqueous media to form the free acids.

Through the concomitant use of the N-functional compound of monomer group a3 it is possible to improve further the heat resistance of the bonded joints by crosslinking. In addition, following acid catalysis with acidic metal salts, solvent-free and plasticizer-free adhesive dispersions are obtainable which have a higher degree of long-term cold water resistance than the dispersions prepared by the mixture technique of DE-A 44 31 343 (see Example 3 and Comparative Example C2).

The ultimate solids content of the heterogeneous polyvinyl ester dispersion of the homo- and/or copolymers A and B is preferably between 30 and 65% by weight, in particular between 40 and 60% by weight and, with particular preference, between 45 and 55% by weight.

Following the end of the polymerizations, further additives can be added subsequently to the dispersion, examples being defoamers, fillers and/or preservatives.

The heterogeneous, solvent-free and plasticizer-free polyvinyl ester dispersions according to the invention, prepared by seed polymerization, can also be converted by spray drying into redispersible dispersion powder adhesives. Spray drying can take place in any desired equipment suitable for the spray drying of liquids and known to the person skilled in the art; for example, apparatus comprising dual-substance nozzles or a rotary atomizer disc, using anticaking agents familiar to the person skilled in the art.

The heterogeneous polyvinyl ester dispersions according to the invention are suitable as adhesive base materials, especially for preparing solvent- and plasticizer-free wood glues, for preparing specialty wood glues with increased water resistance, and for preparing dispersion powders whose redispersions reconstitute solvent- and plasticizer-free adhesives. They are also notable for excellent short-term cold water resistance, allowing them to be classified at least in durability class EN 204/D2. In addition, the dispersions according to the invention can be used to prepare solvent- and plasticizer-free adhesives of increased water resistance for the paper and packaging sectors, and also high-quality adhesives for wall coverings and adhesives for the bonding of furniture films onto chipboard. Areas of application for the adhesives according to the invention are, in particular, indoor rooms with heightened atmospheric humidity (e.g. kitchens, bathrooms, etc.).

The examples which follow serve to illustrate the invention without, however, restricting it. The parts and percentages given in the examples are by weight.

EXAMPLES

Preparing a Seed Emulsion

A vinyl acetate-ethylene pressure emulsion polymer is prepared in a 30 l stirred autoclave with initial introduction of the total amount of vinyl acetate and with an initial ethylene pressure of 50 bar. The polymerization temperature is 60° C. Polymerization is carried out using 7%, based on polymer, of a polyvinyl alcohol with a degree of hydrolysis of 88 mol-% and a viscosity of the 4% strength aqueous solution at 20° C. of 8 mPa.s and 7%, based on polymer, of a polyvinyl alcohol with a degree of hydrolysis of 88 mol-% and a viscosity of the 4% strength aqueous solution at 20° C. of 4 mPa.s, as protective colloid. The polymer has a glass transition temperature of about −10° C. The viscosity is 4 Pa.s (Brookfield RVT 4/20, 23° C.). The solids content is 50%. The proportion of the vinyl acetate-ethylene copolymer, based on the overall mass of the emulsion, is about 43.8%.

EXAMPLES 1 and 2

In a stirred glass reactor with anchor stirrer, equipped with feed ports, reflux condenser, jacket heating and cooling and a nitrogen inlet, 95 parts of the seed emulsion and a solution of 12 parts of partially hydrolyzed polyvinyl alcohol with a degree of hydrolysis of 88 mol-% (composed of 6 parts each of polyvinyl alcohol with a viscosity of the 4% strength aqueous solution of 8 and 18 mPa.s respectively) in 105 (Example 1) or 95.5 parts (Example 2) of deionized water are prepared. Following the addition of 0.1 part of defoamer (®Agitan 280, Münzing-Chemie) and flushing with nitrogen, 5 parts of vinyl acetate are incorporated by emulsification. The internal temperature is raised to 50° C. and the polymerization is initiated following the addition of a solution of 0.03 part of tert-butyl hydroperoxide (70%, ®Trigonox AW 70, Akzo-Chemie) in 0.5 part of water, and a 3.5 hour linear feed of 0.04 part of Rongalit C in 4.2 parts of water is begun. After 20 minutes, one or two, respectively, monomer feeds are started. These feedstreams consist, on the one hand, of 95 parts by weight of vinyl acetate (Example 1) or 94.4 parts of vinyl acetate with 0.1 part of trimethylolpropane triacrylate (in the case of Example 2) with in each case 0.09 part by weight of tert-butyl hydroperoxide and, on the other hand, of 0.5 part of acrylic acid in 9.5 parts of water (only in Example 2) and are metered in over 2.5 hours at an internal temperature of 69–73° C. Following the end of the Rongalit feedstream, polymerization is continued if appropriate with the subsequent addition of aqueous solutions of hydrogen peroxide (30%) and ascorbic acid in order to remove the residual monomers. After cooling, 10% strength sodium hydroxide solution is used to adjust the pH to 5. The viscosities of the dispersion, at a solids content of about 50%, are: 8 Pa.s and 12 Pa.s respectively (Brookfield RVT 6/20, 23° C.).

EXAMPLE 3

In accordance with the procedure indicated above, using 95 parts of seed emulsion, a dispersion is prepared with the difference that, instead of the acrylic acid solution, a solution of 2 parts of N-methylolacrylamide in 13 parts of water is used and trimethylolpropane triacrylate is not used. 5 parts of vinyl acetate are introduced initially, 93 parts of vinyl acetate are metered in, and only 92 parts of water are used in the liquor. (The comonomer solution is prepared by diluting the commercial 48% strength solution of N-methylolacrylamide.) Neutralization is not carried out after the end of polymerization. At a solids content of 50%, a viscosity of 19 Pa.s (Brookfield RVT 6/20, 23° C.) is obtained. In addition, modification is carried out with aluminum chloride solution (28%) (1.5% solid $AlCl_3$/dispersion solids).

Dispersions A1 and A2 for Comparative Examples C1 and C2

Dispersions are prepared in accordance with the procedure of Examples 2 and 3 but with the difference that no seed emulsion is used. First of all, in the case of dispersion A2, there is no addition of aluminum chloride solution.

Characteristics of Dispersion A1: solids content: about 50%, viscosity: 39.5 Pa.s (Brookfield RVT 6/20, 23° C.), MFT 13° C.

Characteristics of Dispersion A2: solids content: about 50%, viscosity: 24.5 Pa.s (Brookfield RVT 6/20, 23° C.), MFT 13° C.

Comparative Examples C1 and C2

To prepare the Comparative Example mixtures C1 and C2 in accordance with DE-A 44 31 343, corresponding parts by weight of the vinyl acetate-ethylene seed emulsion are mixed with the dispersions A1 and A2 in a glass vessel with anchor stirrer in accordance with the details of Table 1, and the mixture is stirred thoroughly for at least 3 hours. In the case of Comparative Example 2, modification is carried out following the end of the mixing operation with 1.5% by weight of aluminum chloride solution (solid $AlCl_3$/dispersion mixture solids) as crosslinking catalyst.

The homo- and/or copolymer compositions A and B and the results of the performance tests are given in Table 1.

The bond strengths are determined on beechwood test specimens in accordance with the testing standard DIN EN 204.

The test specimens are produced by the procedure of DIN EN 205. Gluing and testing is carried out under the following technical conditions:

| | |
|---|---|
| Glue application: | 150 ± 20 g/m², double-sided application |
| Open waiting time: | 3 minutes |
| Closed waiting time: | 3 minutes |
| Pressing time: | 2 hours |
| Pressing pressure: | 0.7 ± 0.1 N/mm² |
| Number of test specimens: | 20 per test run |
| Rate of advance: | 50 mm/min. |
| Testing after storage sequence D2/2: | 7 days standard climate*), 3 days in cold water 7 days standard climate*) |
| Testing after storage sequence D3/3: | 7 days standard climate*), 4 hours in cold water (test temperature: 23° C. ± 2° C.), |
| Testing after storage sequence D1/80° C.**): | 7 days standard climate*), 2 hours of storage at 80° C. (test temperature: at 80° C.), |

*) 23±2° C. and 50±5% relative atmospheric humidity
**) this test is not part of DIN EN 204.

Classification in durability class D2 after storage sequence 2 occurs for a tear strength of ≧8 N/mm².

Classification in durability class D3 after storage sequence 3 occurs for a tear strength of ≧2 N/mm².

Freeze-thaw Stability

The dispersions are stored at −18° C. for 24 hours. They are subsequently allowed to warm up again slowly to room temperature, and the dispersions are evaluated on the basis of the coatings they form on glass.

TABLE 1

| | Example | | | | |
|---|---|---|---|---|---|
| Technique | 1 Seed polymerization | 2 Seed polymerization | 3 Seed polymerization | C1 Mixture | C2 Mixture |
| Dispersion A1 [Parts] | — | — | — | 100 | — |
| Dispersion A2 [Parts] | — | — | — | — | 100 |
| Seed emulsion for mixing [Parts] | — | — | — | 43 | 43 |
| Composition of homo- or copolymer A | | | | | |
| Vinyl acetate (a1) | 100% | 99.4% | 98% | 99.4% | 98% |
| Acrylic acid (a2) | — | 0.5% | — | 0.5% | — |
| N-Methylolacrylamide (a3) | — | — | 2% | — | 2% |
| Trimethylolpropane triacrylate (a4) | — | 0.1% | — | 0.1% | — |

TABLE 1-continued

| | Example | | | | |
|---|---|---|---|---|---|
| Technique | 1 Seed polymerization | 2 Seed polymerization | 3 Seed polymerization | C1 Mixture | C2 Mixture |
| Composition of copolymer B (approximate) | | | | | |
| Vinyl acetate (b1) | 75% | 75% | 75% | 75% | 75% |
| Ethylene (b2) | 25% | 25% | 25% | 25% | 25% |
| $T_g$ of homo- or copolymer A [° C.] | 30 | 30 | 30 | 30 | 30 |
| $T_g$ of copolymer B [° C.] | −10 | −10 | −10 | −10 | −10 |
| Ratio A:B | 1:0.42 | 1:0.42 | 1:0.42 | 1:0.42 | 1:0.42 |
| MFT [° C.] of heterogeneous disp. | 4 | 6 | 6 | 1 | 0 |
| Tear strength as per EN 204 D2/2 [N/mm²] with % wood tearout | 9.1 (55%) | 8.2 (60%) | — | 5.4 (10%) | — |
| Tear strength as per EN 204 D3/3 [N/mm²] | — | — | 3.3 | — | 2.0 |
| Heat resistance D1/80° C. tear strength [N/mm²] | 5.0 | 5.7 | 6.9 | 5.2 | 6.7 |
| Freeze-thaw stability at −18° C. | slightly thickened, stable | stable | stable | stable | stable |

Identical compositions and proportions by weight of the homo- and/or copolymers A and B respectively were used in the inventive Examples 2 and 3 and in the corresponding, Comparative Examples C1 and C2 prepared in the mixing process of DE-A 44 31 343.

The solvent- and plasticizer-free dispersions of the inventive Examples 1 and 2, prepared by seed polymerization of the monomers a1–a3 and, if appropriate, a4 onto the copolymer B as the seed base used possess a high thermal resistance (D1/80° C.), comparable with that of Comparative Example C 1 and are freeze-thaw stable. The freeze-thaw stability is improved further by the comonomers a2 and a3 used. The inventive examples, however, have a higher strength level and higher wood fiber tearout in the short-term cold water resistance of test sequence D2/2 of EN 204 in comparison with Comparative Examples C1 and C2.

Comparison of Example 3 with Comparative Example 2 in accordance with DE-A 44 31 343 shows that a higher value likewise results with the dispersion of the invention in terms of cold water resistance after undergoing the test sequence D3/3.

What is claimed is:

1. A process for preparing a heterogeneous polyvinyl ester dispersion stabilized essentially with polyvinyl alcohol, without the addition of solvents or plasticizers, having a minimum film-forming temperature of below 10° C., comprising the formation of a copolymer A, having a glass transition temperature of more that 20° C., by seed emulsion polymerization of a monomer mixture comprising 85–100% by weight of a vinyl ester of carboxylic acids having 1 to 18 carbon atoms (a1), 0–10% by weight of an α,β-unsaturated carboxylic acid (a2) and/or of an N-functional compound (a3) and 0–5% by weight of a polyethylenically unsaturated monomer (a4), in the presence of a seed base comprising a copolymer B having a glass transition temperature of below 20° C., comprising 45–98% by weight of a vinyl ester of carboxylic acids having 1 to 18 carbon atoms (b1), 2–50% by weight of an α-olefin having 1 to 4 carbon atoms (b2) and 0–5% by weight of a polyethylenically unsaturated monomer (b3).

2. The process as claimed in claim 1, wherein in the polymer A there is at least 0.05% by weight of monomer units consisting of an α,β-unsaturated carboxylic acid (a2) and/or of an N-functional compound (a3).

3. The process as claimed in claim 1, wherein the proportion of the homo- and/or copolymers A and B in the dispersion is 1:(0.05 to 2).

4. The process as claimed in claim 1, wherein the minimum film-forming temperature of the dispersion lies within the range from 0 to 7° C.

5. The process as claimed in claim 1, wherein the glass transition temperature of the homo- or copolymer A is more than 25° C. and the glass transition temperature of the copolymer B is below 15° C.

6. The process as claimed in claim 1, wherein the vinyl ester in the polymers A and B is in each case vinyl acetate and wherein the α-olefin in the copolymer B is ethylene.

7. The process as claimed in claim 1, wherein the polymer A comprises comonomer units from the group consisting of acrylic acid, methacrylic acid, maleic acid, N-methylolacrylamide and N-methylolmethacrylamide.

8. The process as claimed in claim 1, wherein the polymers A and B in the finished dispersion are stabilized by from 2 to 20% by weight of polyvinyl alcohol having a degree of hydrolysis of from 70 to 100 mol-% and viscosities of the 4% strength aqueous solutions at 20° C. of from 2 to 70 mPa.s.

9. The process as claimed in claim 1, wherein the polyvinyl ester dispersion is spray dried and the resulting polymer is subsequently redispersed in water.

10. A process for preparing a polyvinyl ester powder, which comprises spray-drying the polyvinyl ester dispersion prepared as claimed in claim 1.

11. A method of using a heterogeneous polyvinyl ester dispersion according to claim 1, comprising applying said heterogeneous polyvinyl ester dispersion to a substrate, as an adhesive for bonding porous and semiporous substrates.

12. A method of using a heterogeneous polyvinyl ester dispersion according to claim 1, comprising applying said heterogeneous polyvinyl ester dispersion to a substrate, said substrate being selected from the group consisting of wood, furniture films, paper and paper products, for bonding wood, furniture films, paper and paper products.

* * * * *